Aug. 7, 1956
P. J. KITE
2,757,477
FISH LURE
Filed May 6, 1955
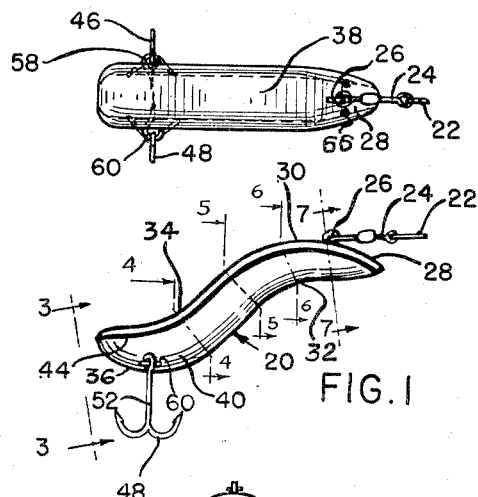
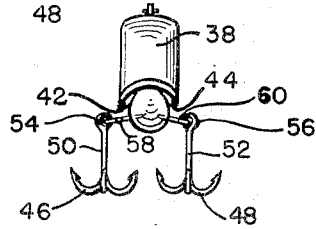
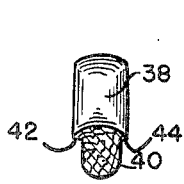 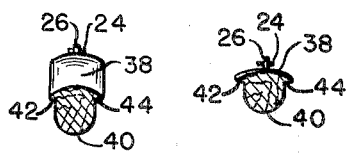 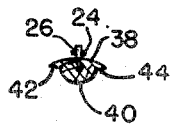
FIG.4  FIG.5  FIG.6  FIG.7
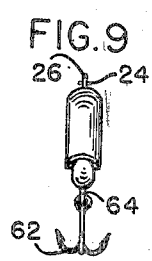 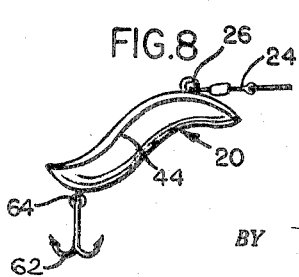
INVENTOR.
PETER J. KITE
BY *F. P. Keiper*
ATTORNEY.

UNITED STATES PATENT OFFICE

2,757,477

FISH LURE

Peter J. Kite, Syracuse, N. Y.

Application May 6, 1955, Serial No. 506,396

3 Claims. (Cl. 43—42.48)

This invention relates to fish lures, and more particularly to a fish lure adapted to simulate live bait and having provision for stability when drawn through the water.

In the design of fish lures, it is desirable to simulate as closely as practical, actual living water life such as fish tend to normally feed upon. The difficulty present in such lures, however, lies in providing a lure in simulation of water life which, when drawn through the water, maintains stability, while providing movement simulating the movement of the water life to which the lure bears a likeness.

The present invention is directed to a lure which bears a likeness to a crab, worm, or a minnow or wounded minnow, and which can be caused by manipulation of the fish line to dive, dart, dip and wiggle in a manner likely to attract fish and effect a catch. The invention is further directed to a lure in which the body portion has a reverse or O-Gee curve lengthwise thereof, and which in transverse section presents downwardly directed shoulders on opposite sides extending lengthwise of the body portion. Further the invention is directed to the application of a leader connection to a lure of the configuration referred to, in combination with a multi prong hook or hooks, the leader and hooks being so disposed with reference to one another and the body portion and shoulders as to effect stability of the lure when drawn through the water so that the lure is caused to maintain a live appearing aspect.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view of one form of the lure.

Figure 2 is a side elevation of the lure shown in Figure 1.

Figure 3 is an end elevation of the lure shown in Figures 1 and 2, as viewed from the plane 3—3 in Figure 2.

Figures 4, 5, and 6 are transverse sectional views taken substantially on the broken section lines 4—4, 5—5, and 6—6 respectively, of Figure 2.

Figure 7 is a transverse section taken substantially on the line 7—7 of Figure 2.

Figure 8 is a side elevation of a modified form of lure adapted to smaller size and having a single multi prong hook; and Figure 9 is an end elevation of the modification shown in Figure 8.

Referring to the modification of Figures 1–7 inclusive, it will be seen that the lure comprises a body portion 20 having reverse curvature from the leader end to the trailing or hook supporting end. The lure, in being drawn through the water by the fish line 22, and leader 24, which is connected to the body portion by an eye 26 assumes the general aspect shown, the forward portion 28, with its convex top curvature 30, and concave under curvature 32 being disposed when in actual use at a higher level than the rearward concave-top curvature 34, and convex under curvature 36 the eye 26 may have a screw shank embedded in an aperture in the body portion.

The top surface 38 of the body is rounded transversely thereof as shown in Figures 4–7, and overhangs the semi-round sectioned belly portion 40 located therebeneath, which is of lesser width. The overhang thus described overlies shoulders 42 and 44 extending along the sides of the body portion, such shoulders having reverse curvature from the forward end to the rear in substantial conformity with the lengthwise curvature or configuration of the body portion. The section will be seen to be somewhat of an inverted hat shape. By hat-shape is meant the vertical section of a derby hat. The lengthwise curvature of the forward end amounts to an arc of about 45°, and the curvature of the rearward end is of similar arcuate length, that is, about 45°.

Three barb cluster hooks or snares 46 and 48, having shanks 50 and 52, with loops 54 and 56 are hung on eyes 58 and 60 affixed to the opposite sides of the belly portion toward the rear thereof, and are located well below the shoulders 42 and 44. The eyes 58 and 60 may have screw shanks threaded into apertures formed in the belly portion.

The eyes provide lateral spacing between the hooks which in practice maintains the hooks sufficiently spaced so as to avoid or minimize any tendency of the hooks 46 and 48 from interentangling with one another. However, such hooks are sufficiently close enough to the body portion to be effective in snaring a fish that is attracted to the live bait simulation of the body portion.

The disposition of the hooks or snares, and their attachment to the lure, in relation to the leader connection as shown, tends to maintain the lure upright in approximately the position shown when drawn through the water. The forward portion of the upper or top surface, when drawn through the water has a tendency to cause the forward end to nose downwardly, and such effect is increased, with an increase in speed at which the lure is drawn through the water. At the same time the shoulders 42 and 44, and particularly the central portion thereof which lies between the section lines 4—4 and 6—6 of Figure 2 has a tendency to lift the rearward end, by an aqua-planing action, such tendency increasing with an increase in the speed at which the lure is drawn through the water.

Since the leader is attached to the forward end at the top thereof, and the hooks are attached at the rearward end close to the bottom thereof, the weight of such hooks, though caused to swing rearwardly by the flow of water therepast, has a distinct tendency to maintain the lure upright, the upright position being substantially that shown in Figure 3. If the lure be made of wood or other material such as plastics of a specific gravity less than water, the enlarged overhanging cross section also assists in maintaining the upright position by reason of the greater displacement of the upper portion extending along substantially the entire length of the body.

A modified version of the lure is shown in Figures 8 and 9 adapted to smaller sizes, wherein the chief variation aside from size, is in the utilization of a single three barb cluster hook 62, hung from an eye 64, the shank of which is screwed into the bottom of the belly portion in approximately the manner shown. It will be seen that the balance between the leader attachment at the forward upper end, and the hook, as thus attached, is in substance the same as the balance created by the two hook clusters disposed in the manner described in connection with Figures 1–7, and thus the action of the lure in the water and its stability does not differ substantially from that described.

To cause the lure to dive, it is only necessary to effect a sharp tug on the line, and to cause the same to dart to one side or the other, the line can be switched by swinging the casting pole to one side or the other while effecting a sharp tug. The lure tends to wiggle as it is drawn through the water, and while the explanation thereof appears somewhat obscure, it is believed that the reverse curvature fore and aft of the shoulders creates a vertical yawing effect as the lure is drawn through the water. In any event the lure provides a simulation of three of the most popular live baits, namely a crab, worm, or minnow or wounded minnow. In simulating these, the forward end of the lure to which the leader is attached simulates the tail, while the rear end simulates the head except in the instance of a crab, in which case eyes 66, as shown in Figure 2 may be provided to provide a crab like effect. In such case the lure may be dragged along adjacent the bottom of the fishing ground, the lure being held down by a sinker suitable disposed in the leader.

Although a single embodiment of the invention with a modification has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A fish lure consisting of an elongated body portion of nonmetallic material having reverse curvature lengthwise thereof comprising upper forward and lower rearward arcuate portions, each of said portions being of approximately forty five degrees in extent and of similar arcuate length, said body portion being of inverted hat shape section throughout its length and defining downwardly facing laterally projecting reverse curved shoulder surfaces extending lengthwise of the body portion near the top on opposite sides thereof and a lengthwise extending semi-round belly portion below said shoulder surfaces, a leader connection located on the upper forward surface of the forward arcuate portion, and at least one snare attached to the rearward portion, in the region beneath said shoulders and in the belly portion.

2. A fish lure consisting of an elongated body portion of nonmetallic material having reverse curvature lengthwise thereof comprising upper forward and lower rearward arcuate portions, each of said portions being of approximately forty five degrees in extent and of similar arcuate length, said body portion being of inverted hat shape section throughout its length and defining downwardly facing laterally projecting reverse curved shoulder surfaces extending lengthwise of the body portion near the top on opposite sides thereof and a lengthwise extending semi-round belly portion below said shoulder surfaces, a leader connection located on the upper forward surface of the forward arcuate portion, and two multi barb snares attached to the rearward arcuate portion on opposite sides of the belly portion beneath said shoulders.

3. A fish lure consisting of an elongated body portion of nonmetallic material having reverse curvature lengthwise thereof comprising upper forward and lower rearward arcuate portions, each of said portions being of approximately forty five degrees in extent and of similar arcuate length, said body portion being of inverted hat shape section throughout its length and defining downwardly facing laterally projecting reverse curved shoulder surfaces extending lengthwise of the body portion near the top on opposite sides thereof and a lengthwise extending semi-round belly portion below said shoulder surfaces, a leader connection located on the upper forward surface of the forward arcuate portion, and a multi barb snare attached to the under surface of the rearward half of the belly portion.

References Cited in the file of this patent
UNITED STATES PATENTS

| | | |
|---|---|---|
| 1,472,638 | Dickman | Oct. 30, 1923 |
| 2,038,127 | Pflueger | Apr. 21, 1936 |
| 2,166,311 | Lund | July 18, 1939 |
| 2,506,263 | Bessinger | May 2, 1950 |
| 2,633,659 | Baum | Apr. 7, 1953 |